United States Patent
Julien et al.

(10) Patent No.: US 9,140,869 B2
(45) Date of Patent: Sep. 22, 2015

(54) FINE-GRAINED OPTICAL SHUFFLE INTERCONNECT TOPOLOGY MIGRATION

(71) Applicant: Telefonaktiebolaget L M Ericsson (publ), Stockholm (SE)

(72) Inventors: Martin Julien, Laval (CA); Robert Brunner, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/195,203

(22) Filed: Mar. 3, 2014

(65) Prior Publication Data

US 2014/0314386 A1    Oct. 23, 2014

Related U.S. Application Data

(63) Continuation of application No. 13/486,736, filed on Jun. 1, 2012, now Pat. No. 8,798,431.

(51) Int. Cl.

| | |
|---|---|
| *G02B 6/00* | (2006.01) |
| *H04B 10/00* | (2013.01) |
| *G02B 6/44* | (2006.01) |
| *H04Q 1/02* | (2006.01) |
| *H04Q 11/00* | (2006.01) |

(52) U.S. Cl.
CPC ............ *G02B 6/4446* (2013.01); *G02B 6/4452* (2013.01); *H04Q 1/025* (2013.01); *H04Q 1/13* (2013.01); *H04Q 11/0005* (2013.01)

(58) Field of Classification Search
CPC .............................. G02B 6/4446; G02B 6/4452
USPC .................... 385/138; 398/116, 140, 141, 164
See application file for complete search history.

(56) References Cited

U.S. PATENT DOCUMENTS

| | | | |
|---|---|---|---|
| 5,394,503 A * | 2/1995 | Dietz et al. | ..................... 385/135 |
| 6,925,052 B1 | 8/2005 | Reynolds et al. | |
| 2008/0044181 A1 | 2/2008 | Sindhu | |
| 2011/0116755 A1 | 5/2011 | Rolston | |
| 2012/0020673 A1 | 1/2012 | Julien et al. | |

* cited by examiner

*Primary Examiner* — Ryan Lepisto
(74) *Attorney, Agent, or Firm* — Murphy, Bilak & Homiller, PLLC (57) ABSTRACT

An optical patch unit is adapted for mounting in or on an optical equipment rack and facilitates a migration from one optical shuffle box or topology to another. The optical patch unit simplifies the replacement of an optical shuffle box, in some cases allowing a phased migration that minimizes system down-time. The optical patch units described herein include passive optical patch panels. Chassis card and optical shuffle connections are terminated at the passive optical patch panel, making it possible to simplify the cabling between the chassis cards and the optical shuffle box. Once installed, chassis card cables do not need to be manipulated at all during subsequent optical shuffle maintenance procedures. Other optical patch units described herein include active optical patch units, which make the migration process less dependent on human intervention and can further reduce system down-time.

6 Claims, 11 Drawing Sheets

FINE-GRAINED OPTICAL SHUFFLE INTERCONNECT TOPOLOGY MIGRATION

RELATED APPLICATION

This application is a continuation of and claims priority to U.S. patent application Ser. No. 13/486,736, filed 1 Jun. 2012.

TECHNICAL FIELD

The present invention generally relates to optical telecommunication systems, and more particularly relates to techniques for managing optical interconnections between optical equipments.

BACKGROUND

Because telecommunication systems are handling increasing quantities of data traffic, optics-based equipment and solutions are gaining momentum. Optical fibers are now commonly used to interconnect systems that require a large network bandwidth over long distances, with a relatively low cost compared to copper cables. As systems grow and optical solutions become more affordable, system designers are also beginning to use optical components and interconnections for short-range communications within systems as well as for long-range connections between systems.

In large-capacity systems, it is common to use a system design that uses an equipment "chassis" as the form factor. Typically, a certain number of printed circuit board (PCB) "blades" can be inserted into such a chassis, and several such chassis can be installed in a rack, allowing system designers to build a scalable system. In order to allow the different blades to communicate with one another, each blade needs to be connected to a backplane, which is responsible to carry the communication signals between the blades.

Figure 1:
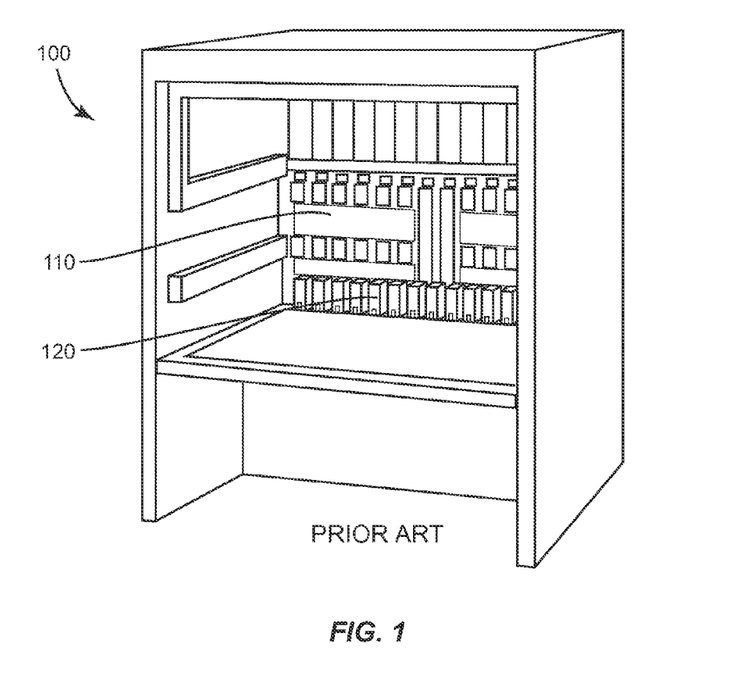
FIG. 1 illustrates an example equipment chassis and its backplane.

Typically, a backplane is passive, i.e. does not require any external electrical power, and is built in such a way that copper traces can be used to exchange information between the blades. FIG. 1 shows an example chassis 100, which can support several cards that are interconnected together through the backplane 110. Backplane 110 has several connectors 120 for connecting each card to it.

Figure 2:
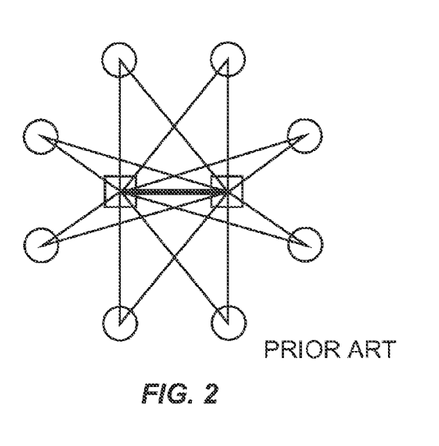
FIGS. 2 and 3 illustrate examples of network topologies commonly applied to backplane designs.
Figure 3:
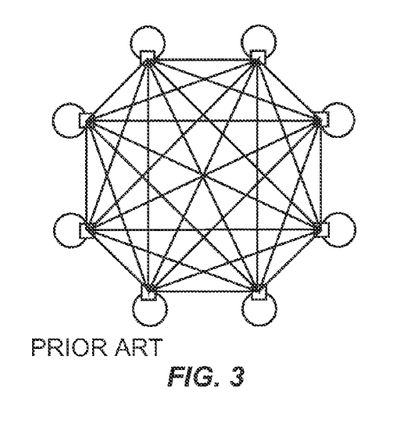

In most systems, the backplane is designed to support a star, a dual-star, a dual-dual-star or a fully-connected network topology. Depending on the network topology selected, more or less copper traces might be required on the backplane. As the number of traces increase, e.g. in the case of a fully-connected network topology, there is a need to develop a multiple layered backplane to account for all the traces required to interconnect all the blades. The common problems with copper-based backplane are related to the facts that copper require a lot of energy in function of the distance, that it is sensitive to interference, and that it offers a limited bandwidth capacity, which means that several parallel traces might be required to fulfill the bandwidth requirement. FIGS. 2 and 3 show different interconnect topologies typically designed in backplanes, namely the dual-dual start topology and the fully connected network topology, respectively.

To simplify the design of backplanes, system designers are increasingly considering the use of optical interconnects. In fact, optics-based solutions offer a much higher bandwidth per trace/interconnect, and are not sensitive to electro-magnetic interference. Both of these qualities simply the development of backplanes. As optical-based technologies become the technology of choice for the future, copper backplanes will be gradually replaced by optical backplanes.

Figure 4:
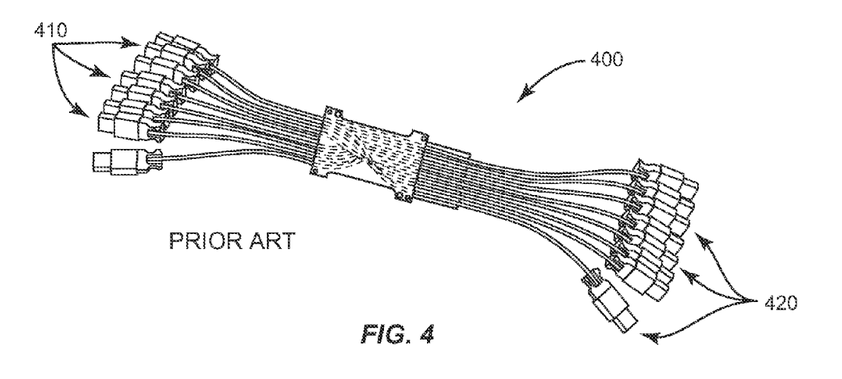
FIG. 4 illustrates an example of an optical shuffle.

One example of an optical backplane is illustrated in FIG. 4. Basically, an optical backplane can be seen as a group of optical fiber cables interconnected together in order to produce a network topology. In the example backplane 400 shown in FIG. 4, each of the connectors 410 and 420 includes multiple fiber ends, e.g., eight fibers per connector. In this configuration, the eight fibers extending from a connector 410 on the left-hand side of backplane 400 are distributed to the eight connectors 420 on the right-hand side of backplane 400. This configuration is typically referred to as an optical shuffle. When such an optical shuffle is installed on the back of a chassis in order to interconnect several chassis cards, it is referred to as an optical backplane. Note that in a chassis, the co-existence of a copper and an optical backplane is possible.

Figure 5:
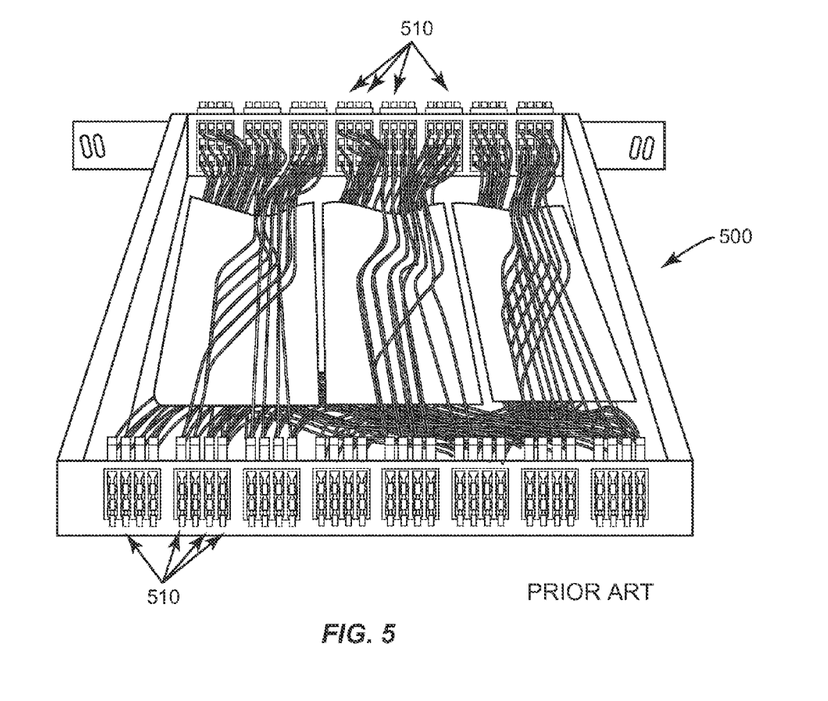
FIG. 5 shows an example of an optical shuffle box.

One or more optical shuffle can be packaged in a box, typically referred to as an optical shuffle box. An optical shuffle box can be used to interconnected several components of one or more systems. One difference between an optical backplane and an optical shuffle box is that the optical shuffle is not limited to interconnect the cards of a single chassis, nor is it limited to the use of backplane connectors, e.g., blind-mate connectors. One example of an optical shuffle box is shown in FIG. 5, where shuffle box 500 includes a large number of optical connectors 510 on both the front and back sides of the shuffle box 500. Once again, each of the optical connectors 510 may terminate several optical fibers, such as 24 fibers per connector.

With the continued growth of telecommunications and increasing requirements for flexibility in terms of interconnection specifications, the option of replacing copper backplanes with optical backplanes continues to become more attractive. Further, replacing those optical backplanes with optical shuffle boxes offers systems designers even more benefits in terms of scalability and flexibility, especially in terms of interconnect technology and ease of deployment.

However, the increasing size and complexity of these systems also tend to make system maintenance and system changes more difficult. Accordingly, improved solutions for optical interconnect systems are needed.

SUMMARY

There are several problems or areas for possible improvement in the maintenance of optical telecommunications racks. For instance, optical shuffles, whether used in an optical backplane or an optical shuffle box, are typically passive. This means that they have a static configuration or interconnect topology. An equipment failure or an upgrade/downgrade procedure may require the replacement of an optical shuffle box, either with an identical unit or with a unit having a different interconnect topology and/or support for more connections. This replacement typically requires a large number of connections to be made by a technician. In the process of disconnecting all of the optical fiber cables from the cards and re-connecting them to the new optical shuffle box, several problems, such as misconnections, might occur.

Furthermore, when an optical shuffle box needs to be replaced, all of the cables need to be moved to the new optical shuffle box. This requires a complete halt to the system's operation during the replacement of the optical shuffle box. While the use of a redundant optical shuffle box may reduce the impact of replacement, this redundancy results in increased system cost.

Several embodiments of the present invention address one or more of these problems. Some of these embodiments include an optical patch unit adapted for mounting in or on an optical equipment rack, the optical patch unit facilitating a migration from one optical shuffle box or topology to another. The optical patch unit simplifies the disconnecting of an old optical shuffle and reconnecting a new one, in some cases allowing a phased migration that minimizes down-time of the optics-based equipment on the system rack.

The optical patch units described herein can be divided into two main categories. A first category includes units that can be described as passive optical patch panels. Chassis card and optical shuffle connections are terminated at the passive optical patch panel, making it possible to simplify the cabling between the chassis cards and the optical shuffle box. Once installed, chassis card cables do not need to be manipulated at all during subsequent optical shuffle maintenance procedures.

A second category of the optical patch units described herein includes units that can be described as active optical patch units. The active optical patch unit simplifies the replacement of one shuffle box with another, whether or not the shuffle boxes have different optical interconnect topologies. In particular, the active optical patch unit makes the migration process less dependent on human intervention, and can reduce the down-time for the system.

More particularly, embodiments of the present invention include an optical patch unit adapted for mounting in or on an optical equipment rack. This patch unit comprises multiple front-side optical connector receptacles arranged on a front side of the optical patch unit, as well as multiple back-side optical connector receptacles arranged on a back side of the optical patch unit. Each front-side optical connector receptacle corresponds to a single one of the back-side optical connector receptacles. The optical patch unit further includes multiple optical interconnections, including an optical interconnection between each front-side optical connector receptacle and its corresponding back-side optical connector receptacle.

In some embodiments, the front-side optical connectors and the back-side optical connector receptacles are each organized into two or more ports, each port including at least two of the front-side optical connectors. In some of these and in other embodiments, the optical patch unit is a passive patch panel comprising a single, static optical interconnection between each front-side optical connector receptacle and its corresponding back-side optical connector receptacle. In some cases, the front-side and back-side optical connector receptacles accommodate a multi-fiber connector, and each of the optical interconnections is a multi-link optical interconnection.

Embodiments of the invention include those in which the optical patch unit is an active optical patch unit, which includes one or more active optical shuffle selector cards. Each active optical shuffle selector card includes two or more of the front-side optical connector receptacles and a set of alternate front-side optical connector receptacles, such that each alternate front-side optical connector receptacle corresponds to a single one of the front-side optical connector receptacles. The active optical shuffle selector card further includes an optical crossbar array providing a selectable optical interconnection from each back-side optical connector receptacle to the corresponding front-side optical connector receptacle and the corresponding alternate front-side optical connector receptacle. In some of these embodiments, each front-side and back-side optical connector receptacle accommodates a multi-fiber connector, and each of the selectable optical interconnections is a multi-link optical interconnection. In some cases, the optical crossbar array is arranged so that all optical links associated with a given back-side optical connector receptacle are simultaneously switched from the corresponding front-side optical connector to the corresponding alternate front-side optical connector receptacle, or vice versa. In other cases the optical crossbar array is arranged so that each optical link associated with a given back-side optical connector receptacle can be individually switched from the corresponding front-side optical connector to the corresponding alternate front-side optical connector receptacle, or vice versa.

Any of the active optical patch units described above may further comprise one or more pass-through optical cards, with each pass-through optical card comprising two or more of the front-side optical connector receptacles and comprising a single, static optical interconnection between each front-side optical connector receptacle and its corresponding back-side optical connector receptacle. Either of both of these pass-through optical cards and the active optical shuffle selector cards can be modular units adapted for field installation and removal.

Further embodiments of the invention include optical equipment assemblies that include one or more of the optical patch units summarized above and methods for using these optical patch units. Details of all of these embodiments are given below.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 6:
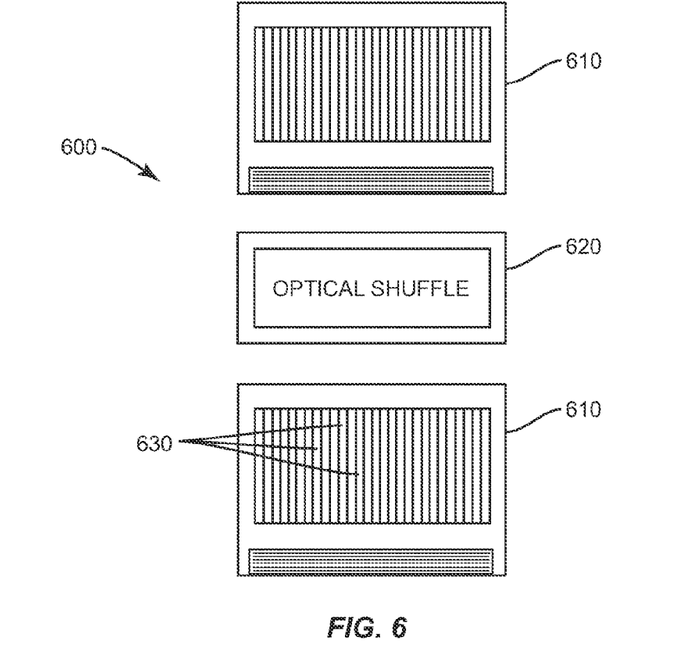
FIG. 6 illustrates the use of an optical shuffle box with two equipment chassis.

FIG. 6 provides a conceptual illustration of an equipment rack 600, which includes two chassis 610 and an optical shuffle box 620 located between them. Each of the chassis 610 includes multiple equipment cards 630. Using the shuffle box 620, it is possible to interconnect all the cards 630 together, regardless of which chassis they are in. In this example, each card is connected to the optical shuffle box, which contains the required interconnect network topology between the different communication links of each card.

While the optical shuffle box provides increased flexibility with respect to the ability to interconnect equipment cards in rack-mounted chassis, there are still several problems or areas for possible improvement in the maintenance of optical telecommunications racks. For instance, optical shuffles, whether used in an optical backplane or an optical shuffle box, are typically passive. This means that they have a static configuration or interconnect topology.

Another problem is that an equipment failure or an upgrade/downgrade procedure may require the replacement of an optical shuffle box, either with an identical unit or with a unit having a different interconnect topology and/or support for more connections. This replacement typically requires a large number of connections to be made by a technician. In the process of disconnecting all of the optical fiber cables from the cards and re-connecting them to the new optical shuffle box, several problems, such as misconnections, might occur.

Furthermore, when an optical shuffle box needs to be replaced, all of the cables need to be moved to the new optical shuffle box. Assuming that the system does not include an already connected, redundant optical shuffle box, this requires a complete halt to the system's operation during the replacement of the optical shuffle box. While the use of a redundant optical shuffle box may reduce the impact of replacement, this redundancy results in increased system cost. Indeed, assuming that each redundant optical shuffle box is required to have the same complete network topology, extra optical fiber cables will be required to the extra optical shuffle box, which implies extra cable and connector cost as well as extra operation and maintenance cost. Still further, extra physical space, i.e., "footprint," will be required for supporting a redundant configuration. For example, the minimum footprint required by two redundant optical shuffle boxes would be double the size required by a single one.

Another issue with optical shuffle boxes is that they often include front plate connectors. That design is not optimized for minimizing the footprint of an optical shuffle box. More particularly, with that type of design the footprint of the optical shuffle box, i.e. the height and the depth, is typically dependent on the size and the number of connectors required on the front and rear plate of the box.

Several embodiments of the present invention address one or more of these problems. Some of these embodiments include an optical patch unit adapted for mounting in or on an optical equipment rack, the optical patch unit facilitating a migration from optical shuffle box or topology to another. The optical patch unit simplifies the disconnecting of an old optical shuffle and reconnecting a new one, in some cases allowing a phased migration that minimizes down-time of the optics-based equipment on the system rack.

The optical patch units described herein can be divided into two main categories. A first category includes units that can be described as passive optical patch panels. As will be shown in further detail below, chassis card and optical shuffle connections are terminated at the passive optical patch panel, making it possible to simplify the cabling between the chassis cards and the optical shuffle box. Once installed, chassis card cables do not need to be manipulated at all during optical shuffle maintenance procedures, since these cables remain connected to the patch panel during maintenance or during replacement of an optical shuffle box and do not have to be moved, replaced or reconnected. Furthermore, the lengths of these cables can be calculated or tailored for the exact distance between the cards and the patch panel only, since these cables will not be later moved. This further simplifies system maintenance and reduces clutter in and around the system.

Likewise, as will be clarified further in the detailed discussion below, the use of a passive optical patch panel also allows the maintenance and replacement of optical shuffle boxes to be simplified. For instance, because an optical shuffle box is connected directly to the passive optical patch panel, rather than to individual equipment cards in one or more chassis, the optical shuffle box can be connected using cables that are the optimal length for reaching corresponding connector receptacles on the passive optical patch panel. Ideally, multiple optical fiber cables of identical length can be used to interconnect an optical shuffle box and a patch panel. In the context of migration from one shuffle box to another, it also becomes possible to simply re-use the same exact optical fiber cables for connecting to the new optical shuffle box. It also becomes more practical to use a "pigtailed" optical shuffle box, where short optical cables with dangling connectors on the ends emerge directly from the optical shuffle box without the use of connectors installed on a front plate of the shuffle box. With the pigtailed shuffle box, the front-plate footprint of the shuffle box can be largely independent of the number and size of the optical adaptors/connectors required to connect the optical shuffle.

A second category of the optical patch units described herein includes units that can be described as active optical patch units. As will be shown in detail below, the active optical patch unit simplifies the replacement of one shuffle box with another, whether or not the shuffle boxes have different optical interconnect topologies. In particular, the active optical patch unit makes the migration process less dependent on human intervention, and can reduce the down-time for the system.

In some embodiments, the active optical patch unit includes one or several removable active optical shuffle selector cards, which may be based on an array of 1×2 optical crossbar switches. Equipment cards in one or more chassis are connected to the active optical patch unit via back-side connector receptacles. Once installed, these connections typically do not need to be changed. Each back-side connector is mapped to one of two corresponding front-side connector receptacles, via the 1×2 optical switches. One shuffle box is connected to one connector receptacle of each of these pairs of front-side connector receptacles. For migration purposes, a second shuffle box is connected to the other connector receptacle of each of these pairs. The optical interconnect between each back-side connector receptacle and the front side of the active optical patch unit can be switched from one front-side connector receptacle in a pair to another, in an automated or semi-automated fashion, allowing a rapid transition from one interconnect topology to another, or from a defective shuffle box to a replacement.

With the flexibility given to the selection of the right optical shuffle box using the concept of the optical shuffle selector card, it becomes possible to carefully plan the migration of individual optical channels, instead of migrating all the channels at one. This fine-grained selection of optical channels could, for example, allow a few optical channels to be migrated to the new interconnect configuration, while the other channels could remain using the old optical shuffle topology. This flexibility allows to possibly better managing traffic and avoiding the loss of packets.

Optical Shuffle Topology Migration

In the context of the present application, an optical shuffle is a component where multiple optical channels are interconnected in order to comply with a determined interconnect topology. Each optical channel on an optical shuffle is typically terminated by a connector, such as an MPO or an MTP connector, which are multiple-fiber push-on/pull-off connector systems typically used for indoor cabling and device interconnections. An optical shuffle box is a box where an optical shuffle and the connectors for the optical shuffle are all terminated.

The discussion that follows refers to the concept of an optical shuffle topology migration. This reflects the support for migrating from one optical shuffle topology to another topology. While this could be done by simply disconnecting the old optical shuffle, replacing it, and reconnecting the connectors, the apparatus and techniques facilitate better strategies, which can simplify maintenance procedures and minimize potential errors due to misconnections. The migration from one optical shuffle interconnect topology to another can be due to a system maintenance procedure requiring the system to scale up or to scale down. In such a case, the interconnect topology might be required to change.

Pigtailed Optical Shuffle Box

As can be seen in FIG. 5, a conventional optical shuffle box typically terminates all the connections directly on the box itself. While this makes the box and the connectors/adapters very strong and well packaged, the design is very rarely optimized for footprint. Considering that each optical fiber has a typical diameter of about 250 micrometers (μm), it is possible to fit 1600 optical fibers within an area of one square centimeter. This means that optical shuffles could be expected to be built relatively small in size, with their lower size limits depending on the connector technology and the interconnect topology used. However, in reality, it is currently only possible to fit between 24 and 72 optical fibers in conventional optical MT connector (6.4 mm×2.5 mm). As a result, an optical shuffle box supporting a very large number of interconnections can be extremely large, physically, due to the very low density of optical fibers on the connectors.

One way to minimize the footprint of the front plate of an optical shuffle box is to focus on the design of the required optical shuffle for the specified network topology, making sure to achieve the lowest footprint as possible in terms of footprint. This can be done by using pigtailed connectors instead of terminating the connectors on the front plate of the optical shuffle box. With this approach, the minimum front plate footprint of the optical shuffle box is not limited by the size of the connectors. Also, this approach eliminates a mated pair of connectors at the front plate of the optical shuffle box for each optical path—this reduces the insertion loss for the network interconnect.

Figure 7:
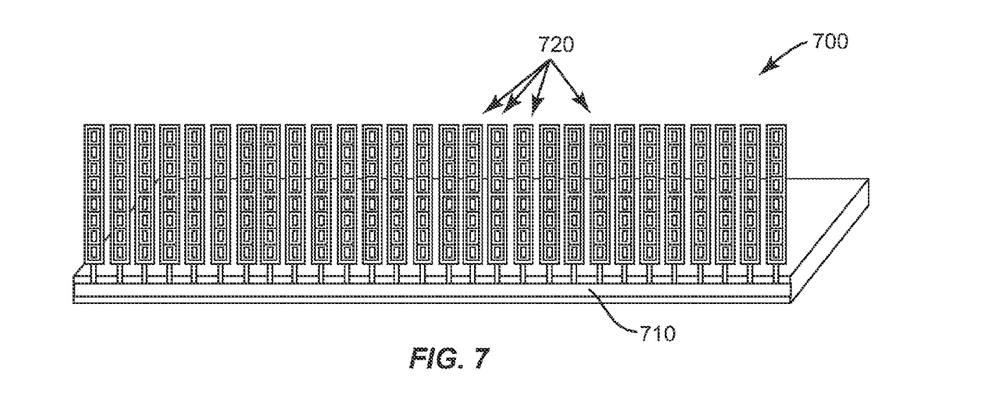
FIG. 7 displays an example of a pigtailed optical shuffle box.

FIG. 7 illustrates this approach conceptually. In FIG. 7, the "box" portion of optical shuffle box 700 has a thin front cross-section 710, since it is not limited by the footprint of front-plate optical connectors. Instead, optical cables emerge directly from the front side of optical shuffle box 700, terminating in connector bundles 720. Connector bundles 720 are pictured in FIG. 7 as tall, thin rectangles with several smaller rectangles in each. Each of these smaller connectors corresponds to an optical connector plug, such as an MPO or MPT connector, in some embodiments. These connectors can be connected to separate cables, in these embodiments, in which case each pigtail comprises of a bundle of optical cables with several distinct connector bodies at the end. Alternatively, a pigtail may be terminated in a (usually larger) connector body that houses multiple, e.g., eight MT ferrules. With this approach, all of the optical connections for a given port can be made with a single installation of this larger connector body. A mix of these approaches might also be used. Each of the pigtailed connector bundles 720 and/or individual connectors in a given bundle could have short or long optical cables, which could be optimized in length to connect directly to another system component, such as an optical patch panel.

The optical cables emerging from optical shuffle box 700, as well as the interconnecting optical connections within shuffle box 700, may be constructed in any of several different ways. For example, the optical interconnections within the shuffle box 700 may be optical fibers embedded in FR-4 or other rigid or semi-rigid "board" material, in some embodiments, in which case the optical cables emerging from the optical shuffle box 700 may be conventional, sheathed, fiber optic bundles terminated in connectors at the appropriate length. In other embodiments, either or both of the optical cables outside the box and inside the box may be optical waveguides etched in a laminate material.

Passive Optical Patch Panel

Figure 8:
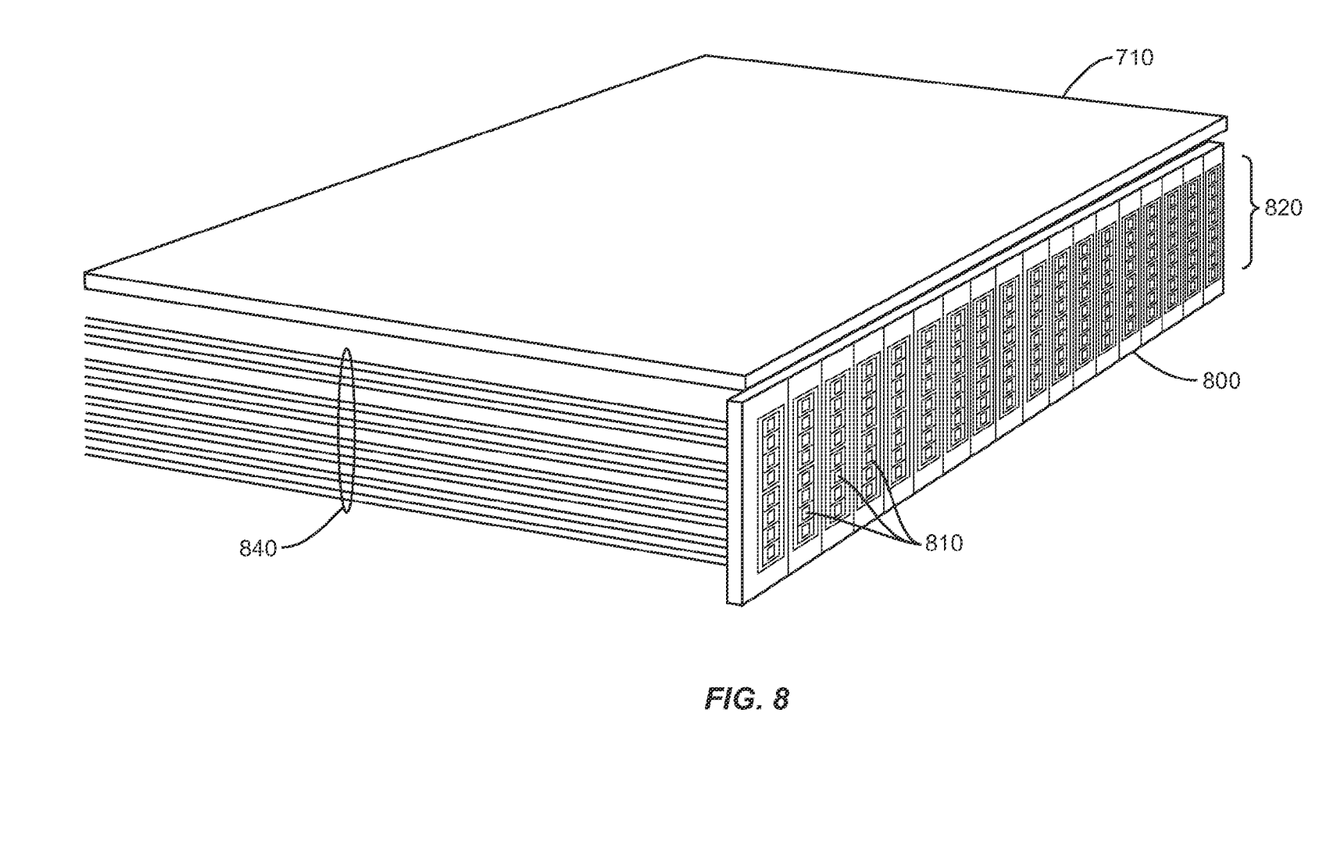
FIG. 8 illustrates a passive optical patch panel.

One strategy for simplifying the process of optical shuffle migration, i.e., the replacing of one optical shuffle with another, is to use an optical patch panel. All of the chassis cards to be interconnected via the optical shuffle are connected to the optical patch panel, as is the optical shuffle itself. An example optical patch panel 800 is illustrated in FIG. 8, along with an optical shuffle 710. In FIG. 8, optical shuffle 710 has its pigtails omitted, for clarity.

Optical patch panel 800, which may be adapted for mounting on or in an equipment rack along with one or more equipment chassis and one or more optical shuffle boxes, has multiple front-side optical connector receptacles 810 on a front side of the optical patch panel. These front-side optical connector receptacles 810 may be organized into two or more "ports" 820, which are simply groups of connector receptacles (each port comprising eight front-side connector receptacles in FIG. 8), with a port 820 generally corresponding to one or several chassis cards. In a rack having two or more chassis mounted in a stacked configuration, with the individual cards inserted vertically, for instance, a particular port 820 on the optical patch panel may conveniently correspond to the one or several chassis card that are vertically in line with that port when the optical patch panel is installed on the rack.

Optical patch panel 800 also includes multiple back-side optical connector receptacles arranged on a back side of the optical patch panel 800. These back-side optical connector receptacles, which are not visible in the perspective view of FIG. 8, are similar to the front-side optical connector receptacles 810, and are configured to mate with connectors on optical cables 840, a few of which are also illustrated in FIG. 8. Each front-side optical connector receptacle 810 corresponds to a single one of the back-side optical connector receptacles. Optical interconnections (not visible in FIG. 8), run through the optical patch panel 800, so that there is an optical interconnection between each front-side optical connector receptacle 810 and its corresponding back-side optical connector receptacle. Note that the front-side connector receptacles 810 and the back-side connector receptacles may be designed to accommodate multi-fiber optical connectors, such as MPO or MTP connectors. In this case, the optical interconnection between each front-side optical connector receptacle 810 and its corresponding back-side optical connector receptacle is a multi-link optical interconnection, i.e., consisting of multiple fibers or other optical waveguides.

In some embodiments, each front-side optical connector 810 and its corresponding back-side optical connector receptacle are part of a single bulkhead adapter or faceplate adapter. One side may be configured to accept a male connector body, while the other is configured to accept a female connector body, for example. In some cases, such a bulkhead adapter or faceplate adapter may be essentially hollow in construction, but formed so that optical ferrules in connector bodies inserted into the faceplate are optically aligned, i.e., with an unobstructed optical line-of-sight between them. In other cases, a bulkhead adapter or faceplate adapter may include a waveguide, such as an expanded-beam interconnection, which is made up of an array of lenses with a large diameter waveguide. The latter approach is less prone to failures that might arise, for example, from a speck of dust.

Figure 9:
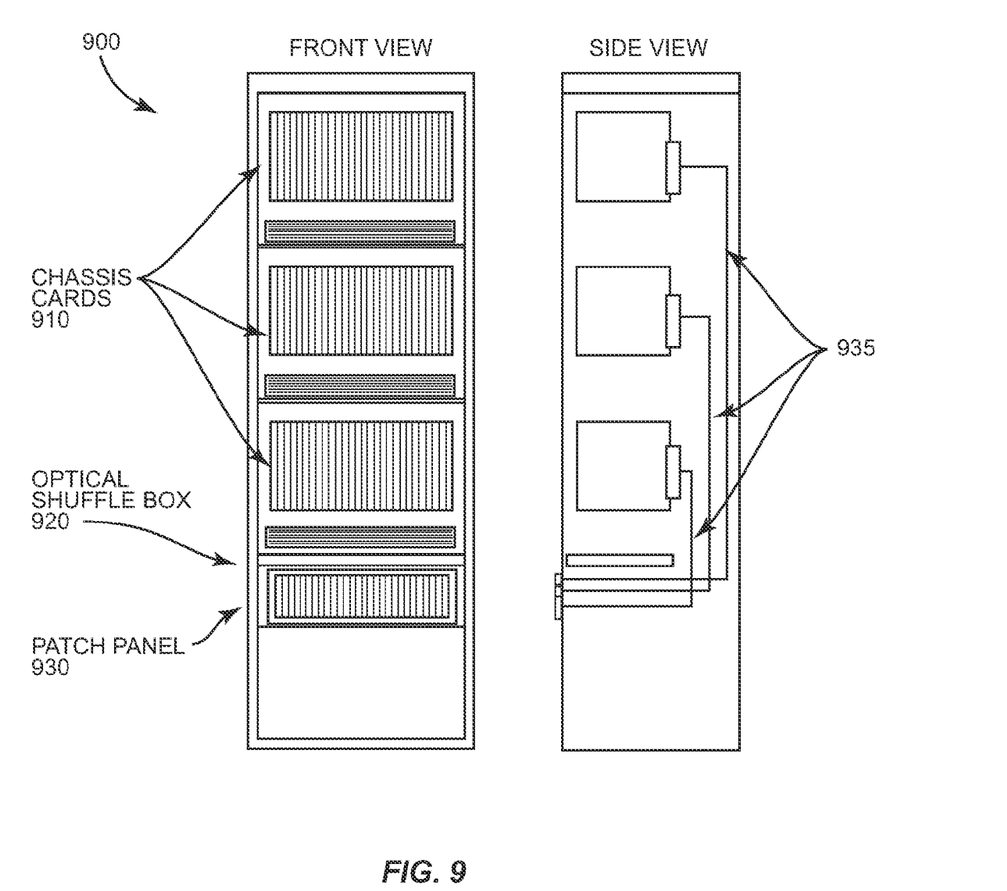
FIG. 9 shows the use of an optical patch panel with several equipment chassis and an optical shuffle box.

FIG. 9 illustrates an example application of the optical patch panel described above, in a rack of optical equipments. Rack 900 includes three optical chassis 910, each comprising several chassis cards. Rack 900 also has an optical shuffle box 920 installed, as well as an optical patch panel 930.

The optical shuffle box 920 is used to establish a desired interconnection between the chassis cards in chassis 910. Conventionally, the chassis cards would be connected directly to an optical shuffle or optical shuffle box. However, as discussed above, changes from optical shuffle to another can be challenging with the conventional approach.

In the system described in FIG. 9, the chassis cards are not connected directly to the optical shuffle box 920, but are instead connected to the optical patch panel 930. More particularly, in the pictured embodiment the chassis cards are connected to back-side optical connector receptacles on the optical patch panel 930, e.g., using fiber optic cables 935.

The optical shuffle box 920 is connected to front-side optical connectors on the optical patch panel 930. These connections may be made with conventional fiber optic cables, in some embodiments, if the shuffle box 920 is configured with front-panel connector receptacles. Alternatively, these connections may be made with pigtailed connectors or connector bundles emerging from the shuffle box 920, as discussed above.

A key advantage of the configuration shown in FIG. 9 is that once the chassis card connections are made, they typically do not need to be removed, even in the event of a migration from one shuffle to another. Further, the chassis cards are connected on the back of the patch panel, while the optical shuffle is connected to the patch panel on the front side. With this design, when an optical shuffle needs to be replaced, only the cables between the optical shuffle and the patch panels need to be reconnected, not the ones between the chassis cards and the patch panel. This change can be accomplished with a straightforward disconnection of the old shuffle box and reconnection of a new one, using only front-side connections. By decoupling the interconnection from the chassis cards to the optical shuffle box with an optical patch panel, it also becomes possible to pre-install all the optical fiber cables between the chassis and the patch panel, independently of the number of chassis cards installed, or the topology of the optical shuffle used.

As mentioned above, the optical patch panel may be used with optical shuffle boxes having front-panel connector receptacles or having pigtailed connectors. With the pigtailed optical shuffle box, it is possible to reduce the vertical footprint required by the optical shuffle box, since the size of the front plate is not dictated by the physical size of the connectors, which is typically the determinant factor. One way to take advantage of the reduced front plate footprint of a pigtailed optical shuffle box is to re-use the saved space with another optical shuffle. In such a scenario, one optical shuffle could be used actively by the system, while the other one is used only in case of failure of the other, for example.

Passive Optical Shuffle Selection

Figure 10:
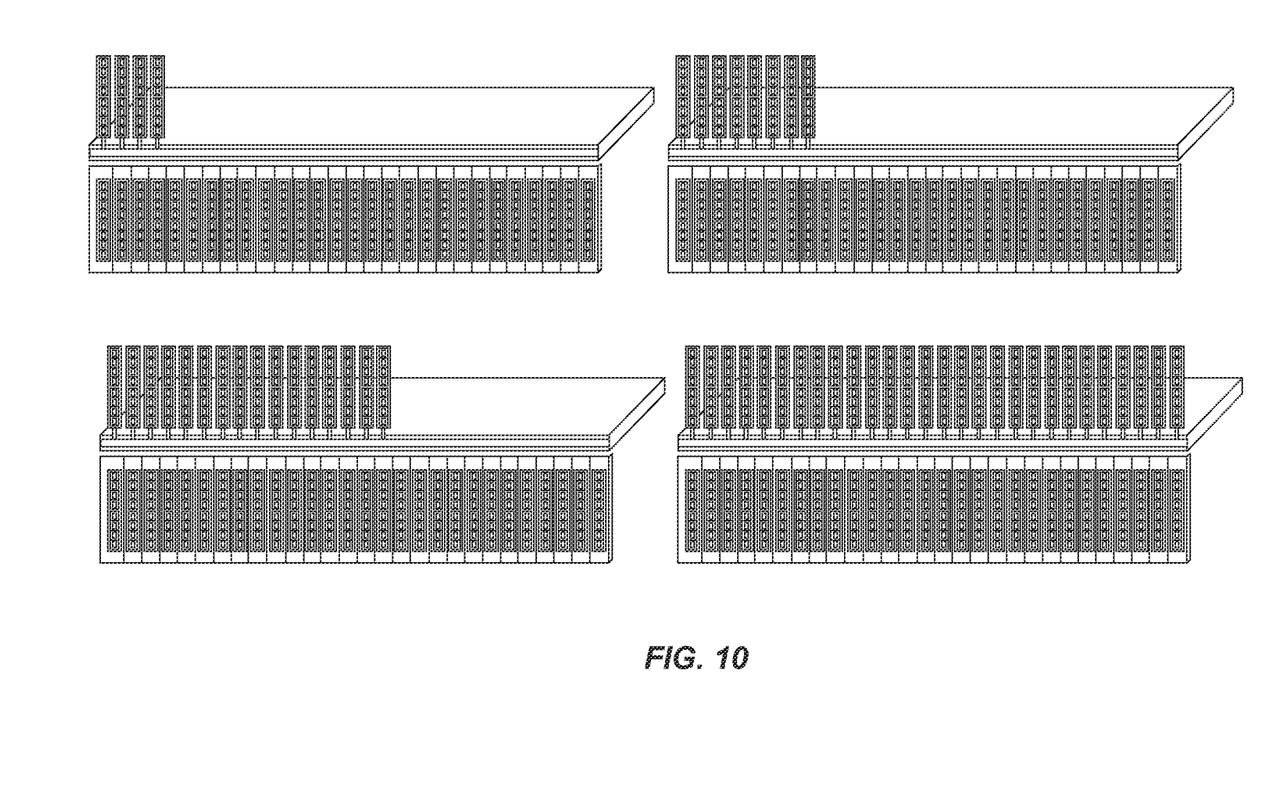
FIG. 10 illustrates several shuffle boxes having different interconnection topologies.

Several different variants of an optical shuffle box might be available for a system. These variants might reflect interconnection topologies of a different type, or might support a larger or smaller number of interconnections for a given topology. FIG. 10 illustrates several examples of optical shuffle boxes that support different numbers of interconnections. The smallest example shown in FIG. 10 supports four ports, while the largest supports 32. Each shuffle box unit illustrated is paired with an optical patch panel below it; optical connections from the shuffle box are made directly to the front of the optical patch panel as discussed earlier.

Manual Optical Shuffle Topology Migration

It will be appreciated that each of the examples in FIG. 10 is paired with a passive optical patch panel that is identical in each of the four examples. Migrating a system from one of these shuffle boxes to another is simply a matter of disconnecting the old shuffle box from the front of the passive optical patch panel, inserting a new one, and connecting the new shuffle box to the front of the passive optical patch panel. If the new shuffle box supports the same number of ports and the chassis card configuration is unchanged, no further action is required. In a system upgrade, where additional chassis cards are added so that additional ports are needed on the shuffle box, the new chassis cards are connected to the back of the optical patch panel. In many cases, upgrades in system capacity will not require any changes to be made to the previous chassis card connections.

Accordingly, choosing from among several variant shuffle box sizes for a given type of system allows system designers to achieve different scaling factors in terms of interconnect. The more ports an optical shuffle contains, the more optical fiber interconnect it will require.

The idea of changing from one optical shuffle box with a certain interconnection topology to another optical shuffle box with another interconnection topology (including a topology of the same type but having a different scale) is referred as an optical shuffle topology migration. The migration described above may be referred to as a "manual" optical shuffle topology migration, in that human manipulation of the optical connections is required. This is to be contrasted with an electrically controlled configuration, in which at least part of the migration may be handled with electrically controlled switches.

Figure 11:
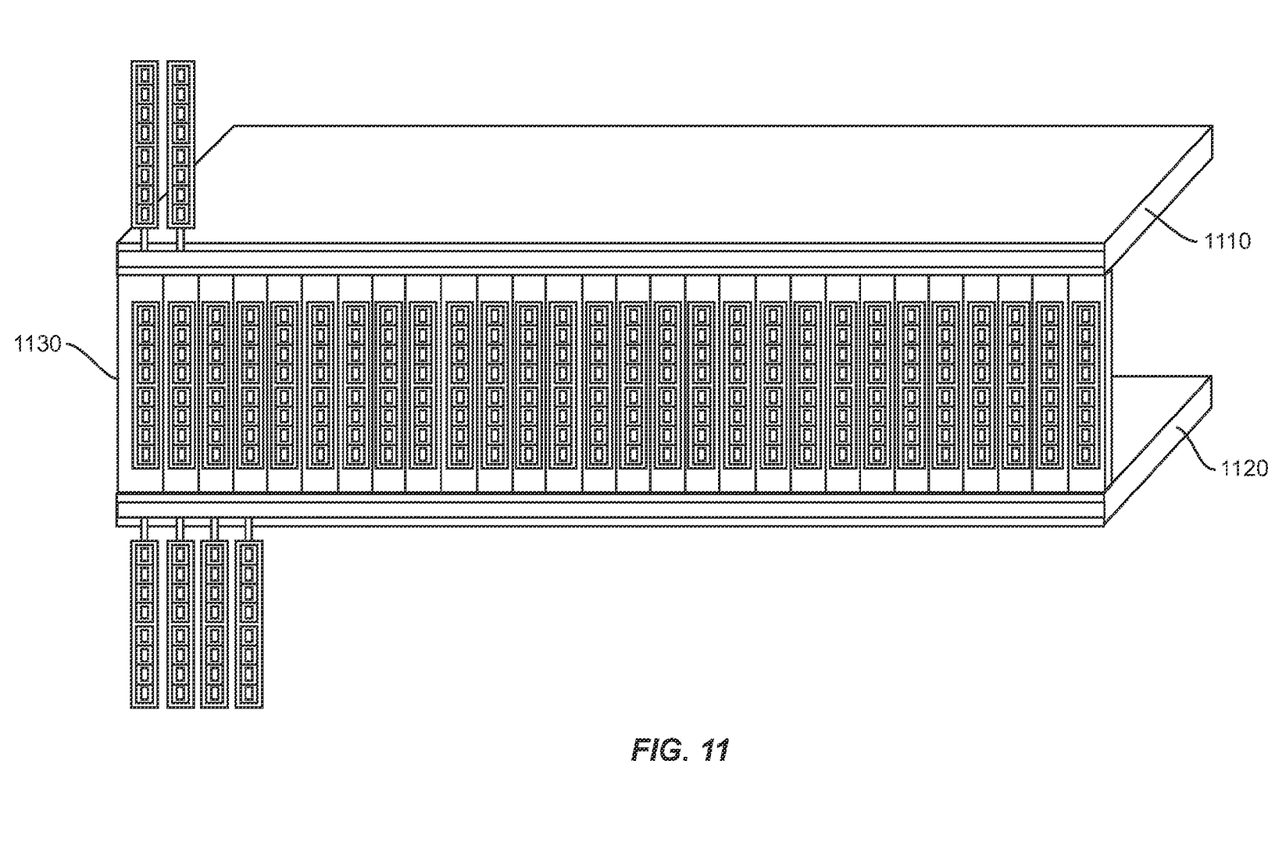
FIG. 11 illustrates a migration between shuffle boxes having different interconnection topologies.

FIG. 11 illustrates the concept of a manual optical shuffle topology migration. In FIG. 11, two optical shuffle boxes are present in the rack. A first optical shuffle box 1110 supports two ports, and thus has two pigtailed bundles of connectors. The second optical shuffle box 1120 supports four ports. Assuming that the optical shuffle box on the top initially has its pigtailed connectors connected to the patch panel 1130, a technician could disconnect the pigtailed connectors of the top optical shuffle 1110 from the optical patch panel 1130, and then connect the corresponding pigtailed connectors of the optical shuffle box 1120 located below the patch panel 1130. In this example, the optical shuffle box on the top has only two connectors, while the optical shuffle box at the bottom has four connectors. Migrating from an optical shuffle with two connectors to another with four connectors typically implies an interconnection topology change between the connectors.

It will be appreciated that the same procedure could also be used for simply replacing a faulty optical shuffle box, in which case the optical shuffle box at the bottom would have exactly the same topology as the one on the top. Later, assuming that the optical shuffle box at the bottom is now the one currently used by the system, another optical shuffle topology migration could be done in the same manner, with yet another optical shuffle box inserted into the upper location. The idea is simply to keep alternating between the one on the top and the one at the bottom for each topology migration.

Active Optical Shuffle Selection

The concept of "active" optical shuffle selection relates to an ability to select an optical shuffle using active components. Depending on the configuration of the active components, one or another optical shuffle could be selected for interconnecting system components.

Figure 12:
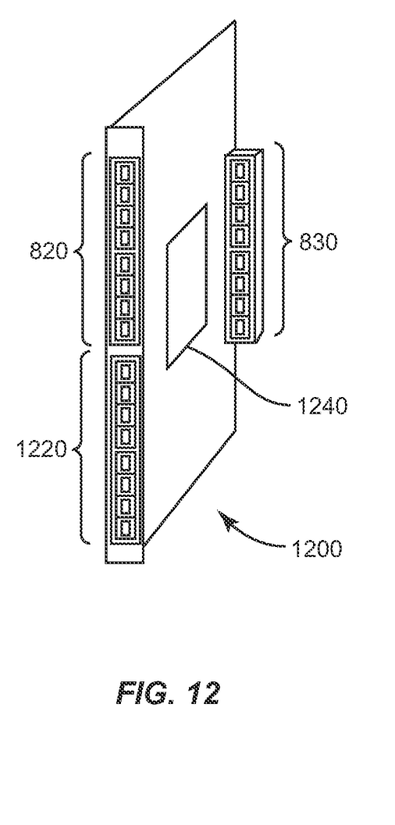
FIG. 12 pictures an active optical shuffle selector card.

FIG. 12 illustrates an example of an active optical shuffle selector card 1200. An active optical shuffle selector card 1200 typically corresponds to a port (i.e., group of optical interconnections). Each active optical shuffle selector card 1200 includes first front-side optical connector receptacles 810 for the corresponding port, as well as a set of alternate front-side optical connector receptacles 1220 for the corresponding port. Each alternate front-side optical connector receptacle 1220 corresponds to a single one of the front-side optical connector receptacles 810. The active optical shuffle selector card 1200 further includes back-side optical connector receptacles 830; each back-side optical connector receptacle 830 corresponds to one of the first front-side optical connector receptacles 810 and its corresponding alternate front-side optical connector receptacle 1220. An optical crossbar array 1240 provides a selectable optical interconnection from each back-side optical connector receptacle 830 to the corresponding front-side optical connector receptacle 810 and the corresponding alternate front-side optical connector receptacle 1220. Active optical shuffle selector cards 1200 are modular units adapted for field installation and removal.

As shown in FIG. 12, an optical crossbar array could be used in order to redirect optical signals from the back of the optical shuffle selector card to the front ports of the card. Assuming that the optical crossbar switch located on the card is an array of 1×2 optical crossbars, then one port from the back of the card could be selectively switched between two outgoing associated ports. That means that the number of optical connections on the front side of the card has to be twice the number of optical connections on the back side of the optical shuffle selector card. This is the case in the example embodiment of FIG. 12, where there are two sets of eight connector receptacles on the front side, compared to one set of eight connector receptacles on the back. It should be appreciated that this concept can be extended to allow a back-side port to be selectively connected to one of three (or more) front-side ports.

The two sets of connectors on the front side of active optical shuffle selector card 1200 can be in turn connected to two different optical shuffles, which means that the crossbar array 1240 allows the back-side port to be selectively switched between two different optical shuffles. Several options are possible commercially for building optical crossbar 1240. Optical crossbar switches are typically meant for large number of ports, e.g. a 16×16 configuration. By requiring an array of 1×2 optical crossbars, the design of the optical crossbar array could become much simpler, more scalable and more cost effective.

Figure 13:
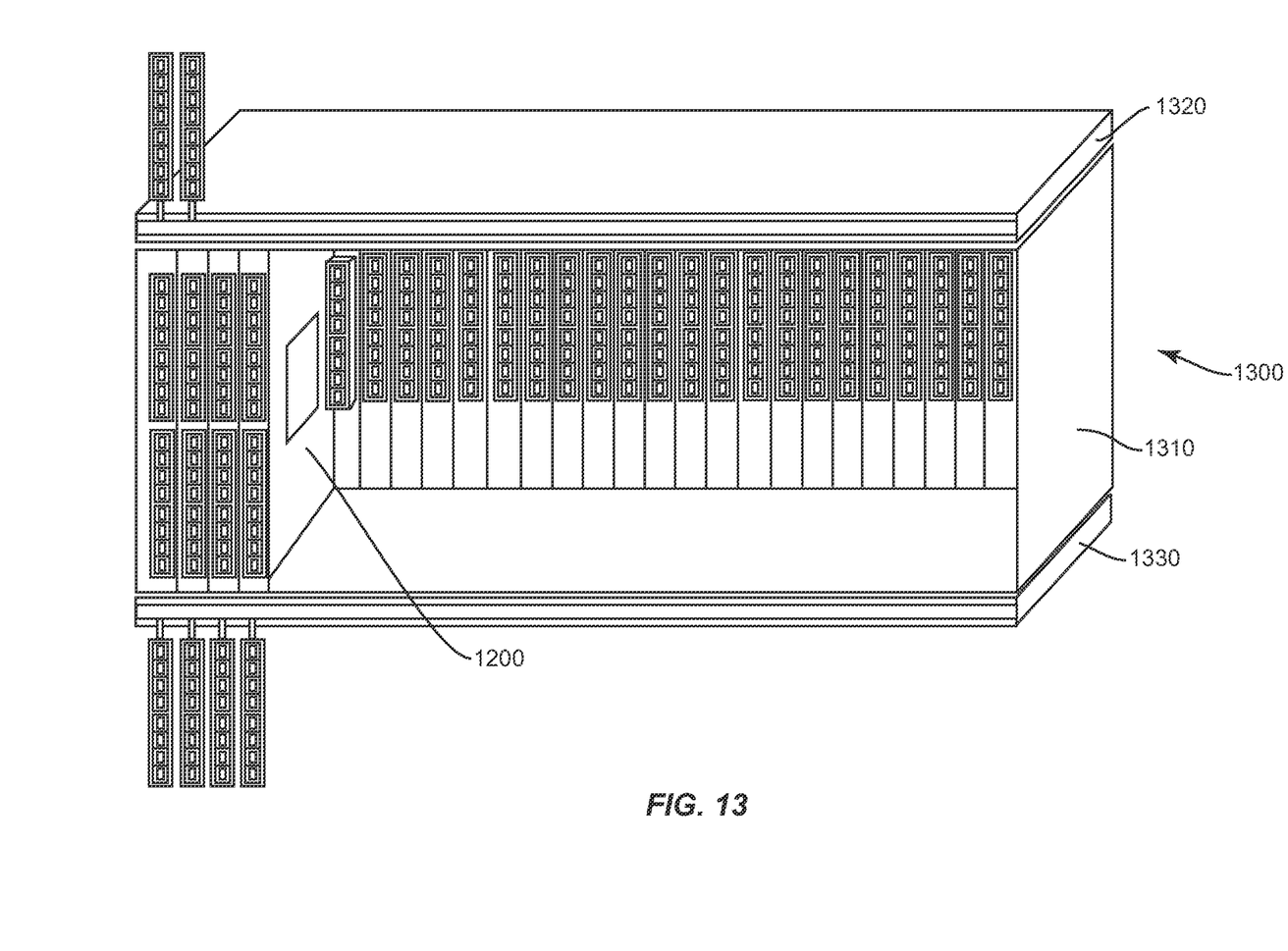
FIG. 13 illustrates a migration between two optical shuffle boxes using an active optical patch unit.

Multiple active optical shuffle selector cards 1200 can be installed in a simple chassis to create a rack-mountable optical patch unit that permits an easy and quick migration from one shuffle box to another. An example is shown in FIG. 13, where four active optical shuffle selector cards 1200 are installed in a chassis 1310 to form an active optical patch unit 1300. Also shown in FIG. 13 are a two-port optical shuffle 1320 and a four-port optical shuffle 1330.

As shown in FIG. 13, several optical shuffle selector cards can be inserted into a chassis. The idea is to use as many optical shuffle selector cards as required for the envisioned system in terms of optical interconnect. Additional optical shuffle selector cards can be inserted as the system grows to support more chassis cards. In this example, each optical shuffle selector card 1200 contains an array of 512 1×2 optical crossbars or switches. This means that the optical interconnects can be switched at the granularity of a single fiber or optical link. The 512 1×2 switches support up to 64 fibers in each of the eight connector receptacles per port. Differently sized optical crossbars can be used to support different fiber/connector configurations. These optical crossbars can allow switching at the granularity of a single optical link, or may only allow switching to be performed in groups, in various embodiments.

Electronically-Assisted Optical Shuffle Topology Migration

The concept of "electronically-assisted" optical shuffle topology migration refers to the fact that there is no need for manual human intervention in order to actually switch from one optical shuffle box to another. Assuming that the two optical shuffle boxes contain a different interconnection topology, a topology migration is possible by simply re-configuring the optical crossbar array of each optical shuffle selector cards in order to perform successfully the migration.

Referring back to FIG. 13, it can be seen that both optical shuffle box 1320 and optical shuffle box 1330 can be connected to the same optical shuffle selector cards, at the same time. In the pictured example, the two pigtailed bundles from shuffle box 1320 can be connected to the upper connector receptacles on the first two shuffle selector cards 1200, while the four pigtailed bundles from 1330 are connected to the lower connector receptacles on the first four shuffle selector cards 1200. Of course, this means that each optical shuffle selector card requires twice as many connector receptacles as minimally required by a single optical shuffle. However, this also means that each selector card can selectively connect the back-side connections to the chassis cards from one optical shuffle to the other simply, based on the electronic configuration of the active switches in the selector cards 1200.

Again looking at FIG. 13, it should be appreciated that the back of the chassis 1310, where the optical shuffle selector cards are inserted, can be compared to the passive optical patch panel described earlier. While the connector receptacles at the back of the chassis 1310 are connected to the chassis cards, the optical shuffle selector cards 1200 are connected in the chassis 1310. Assuming that the optical crossbar array used on the optical shuffle cards 1200 is based on 1×2 optical crossbars, then optical waveguides could be directed either towards the ports on the top front or the bottom front ports of the cards. In this scenario, the two optical shuffle boxes could be temporarily connected to the same optical shuffle selector cards, which become responsible for selecting one or the other optical shuffle box. In this example, an array of 512 1×2 optical crossbars are built per optical shuffle selector card and a two-port topology is migrated to a four-port topology (or vice versa).

Figure 14:
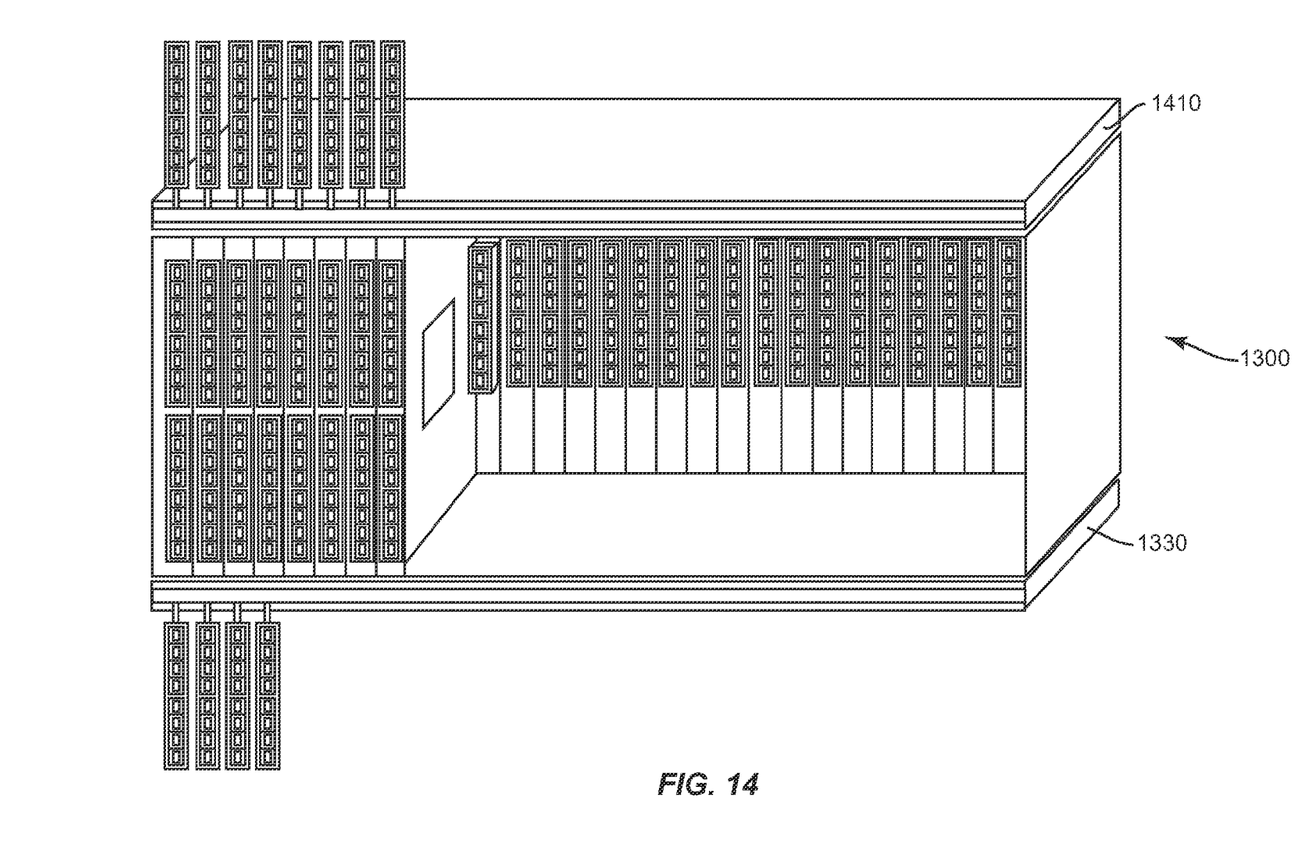
FIG. 14 is another example of a migration between two optical shuffle boxes.

In FIG. 14, the same concept is applied, except that the optical shuffle topology migration occurs from the four-port topology configuration of shuffle box 1330 to the eight-port topology configuration of a newly installed shuffle box 1410. The same idea could also be used simply to replace an optical shuffle by another having the same topology, for example in case of failure.

Pass-Through Optical Card

A migration from one optical shuffle box to another might be required in order to replace a faulty or malfunctioning optical shuffle box, in which case the existing shuffle box can be replaced by another optical shuffle box with exactly the same number of ports and the same interconnect topology. In the context where a system is required to scale, however, an optical shuffle topology migration is required. This means that the optical shuffle box already installed on the system has an interconnect topology that is required to be changed, either to scale up or to scale down. Changing the interconnect topology of an optical shuffle means that more or fewer ports should be available on the new optical shuffle box, which also means that the number of the optical waveguides available and the number of optical fiber cables required for the new interconnect topology will be more or fewer, depending whether the interconnections require scaling up or down.

Some systems are designed to scale up to a certain limit, e.g., up to a point where all the slots in one or several chassis are occupied. The last step of this up-scaling can allow for certain optimizations using the techniques and apparatus described above. For example, in order to scale a system to its capacity limit, several intermediate optical shuffle migration options might be possible. Assuming that a system could be scaled using five possible variants of optical shuffle interconnect topologies, for example, this means that the system could start with the first variant for a small size system, and migrate to the second, the third, the fourth and finally the fifth variant, as the system is scaling to its maximum capacity. Referring to FIG. 13, for example, possible variants for shuffle interconnect topologies might include support for two, four, eight, sixteen, and thirty-two ports.

When the system has reached its last stage of possible interconnect topology, there might be no more need to require an optical shuffle selector card with its optical crossbar array function. In fact, there is no need for such function since there is only one last possible interconnect topology for the last scaling variant. Basically, for the last incremental upgrade of the interconnect topology, all the new connections available on the last variant of the optical shuffle interconnect topology are fixed and will not ever need to be migrated to another optical shuffle topology. Since the last increment of the system optical shuffle topology scalability does not require any optical shuffle selector cards, pass-through cards can be used instead of active optical shuffle selector cards. This solution is less expensive and is a passive solution.

Figure 15:
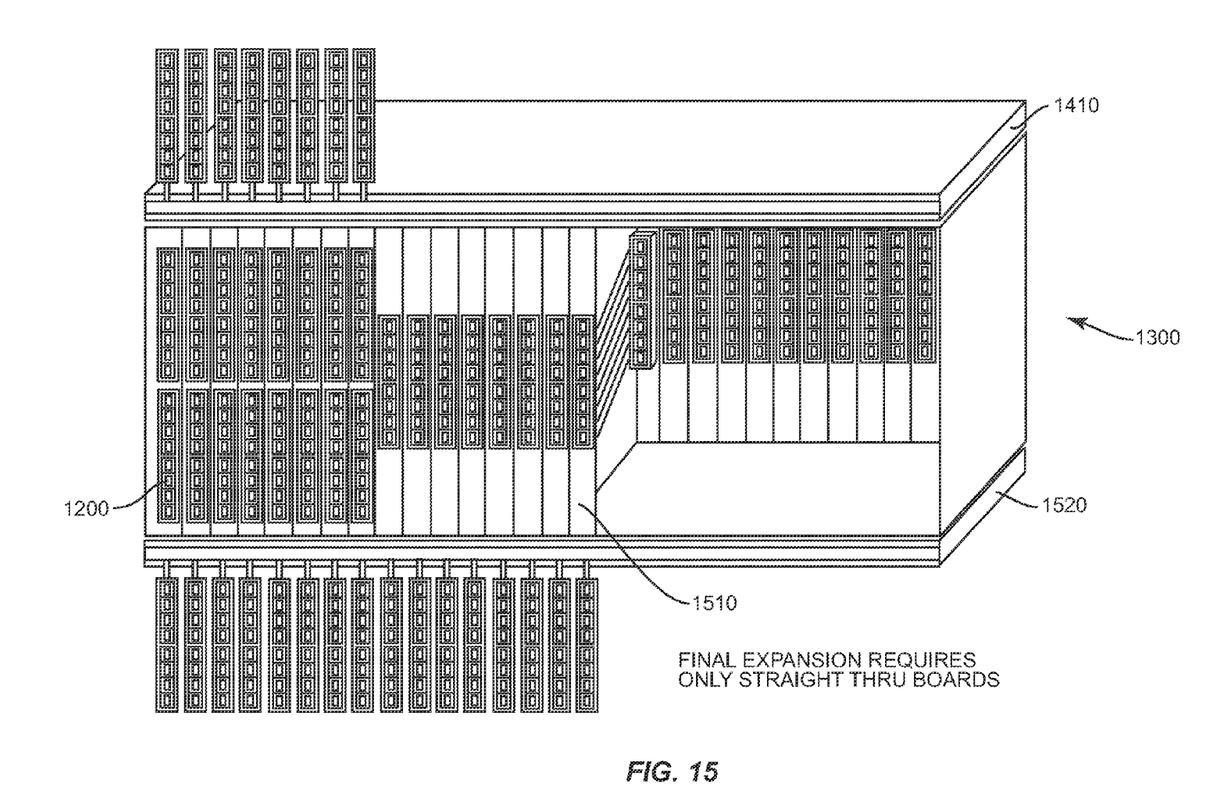
FIG. 15 illustrates the use of a passive pass-through optical card in an active optical patch unit.

For example, assume that an optical equipment installation is upgradeable in several steps, with the largest scale configuration requiring a sixteen port shuffle and the second largest configuration requiring eight ports. FIG. 15 illustrates a possible configuration for an optical patch unit configuration that supports the last upgrade migration.

In the illustrated configuration, active optical patch unit 1300 is populated with eight active optical shuffle selector cards 1200 and eight passive pass through cards 1510. For the last migration, sixteen-port shuffle box 1520 is connected to the bottom connector receptacles of active shuffle selector cards 1200 and to the connector receptacles of pass through cards 1510. As is the case in the example configuration of FIG. 15, the last stepping increment of an optical shuffle interconnect topology migration typically requires as many pass-through optical cards 1510 as optical shuffle selector cards.

Fine-Grained Optical Shuffle Topology Migration

Given the electronically-assisted optical shuffle topology migration described above, it is possible to have two different optical shuffle boxes, with possibly different topologies, connected at the same time to the same optical shuffle selection cards. Since the array of optical crossbars on the optical shuffle selector card can be configured one optical crossbar at a time, i.e. at the granularity of a single 1×2 optical crossbar, it is possible to strategically plan the migration of the optical waveguides between the optical shuffles. By carefully selecting the timing and the order of the waveguides to be migrated, it becomes possible to strategically provide minimal service disruption, if not to completely avoid it.

For example, assuming that two system components require several communication channels between them, all the communication channels between them can be migrated simultaneously in order to provide synchronous migration of the interconnect topology. Alternatively, it could be done one channel at a time. Also, in a situation where each communication channel is bi-directional, the optical links for corresponding transmission and reception channels between the two associated system components can be migrated simultaneously.

The several embodiments of the invention described above can provide several advantages. For example, with the pig-tailed optical shuffle box, the front plate footprint can be independent of the number and size of the optical adaptors and/or connectors required to connect the optical shuffle. The passive optical patch panel described herein simplifies the cabling between chassis cards and an optical shuffle box. Because chassis card cables are terminated at the passive optical patch panel, these cables do not need to be manipulated between optical shuffle maintenance procedures. The length of the cables can be calculated or tailored for the exact distance between the cards and the patch panel only, which means that once the cables between the chassis cards and the patch panel are installed, no more maintenance will be required for that cabling.

Furthermore, by installing the passive optical patch panel between two optical shuffle boxes, it is possible to plan to greatly simplify the maintenance and/or replacement of an optical shuffle box. Because system components, such as chassis cards, only need to connect to the patch panel with known cable length, optical shuffle boxes can be designed for the right optical cable length to interconnect to the optical patch panel. Ideally, multiple optical fiber cables of the same length could be used to interconnect an optical shuffle box and a patch panel. In the context of migration, it becomes possible to simply re-use the same optical fiber cables for connecting to the new optical shuffle box.

The process of migrating from one optical shuffle box to another is also simplified, as the migration can be completed by simply disconnecting the old optical shuffle from the front side of the optical patch unit and connecting the cables to a new optical shuffle. This can be quite advantageous in terms of cost, simplicity and reliability.

The active optical patch unit described herein also simplifies the migration process between optical shuffle boxes, and has the further advantage of reducing the down-time of the system, whether or not the migration is to replace a defective shuffle box or to move the system to a new shuffle box having a different interconnect topology. Additional flexibility is provided to with the active optical shuffle selector card, which is based on the use of an optical crossbar array that provides a selectable optical interconnection from each back-side optical connector receptacle to one of two corresponding front-side optical connector receptacles. With the active optical shuffle selector card, it becomes possible to plan for the migration of chosen optical channels, instead of migrating all the channels at once. Basically, this fine-grained selection of optical channels could, for example, allow a few optical channels to be migrated to the new interconnect configuration, while the other channels could remain using the old optical shuffle topology. This flexibility allows to possibly better management traffic and a minimizing of packet loss.

The modular structure of some embodiments of the active optical patch unit allows the use of passive pass-through cards along with or instead of active optical shuffle selector cards. These can be much cheaper and completely passive solutions.

It should be appreciated that in the preceding discussion, terms such as "first", "second", and the like, are used to distinguish various elements, regions, sections, etc., from one another and are not intended to imply a particular order or priority, unless the context clearly indicates otherwise. Like terms refer to like elements throughout the description. Likewise, as used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise. When a process is illustrated or claimed herein, it should be understood that the steps or operations of that process may be performed in any order unless the context clearly requires otherwise. Finally, it is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical equipment assembly, comprising:
    an optical shuffle unit having multiple optical connectors organized into two or more ports, the optical shuffle unit further including a plurality of shuffle interconnections among the optical connectors according to an interconnection topology;
    a plurality of optical equipment cards adapted for mounting in an equipment chassis, each of the optical equipment cards corresponding to one of the ports and having one or more optical inputs or optical outputs or both; and
    an optical patch unit adapted for mounting in or on an optical equipment rack, the optical patch unit comprising:
    multiple front-side optical connector receptacles on a front side of the optical equipment rack;
    multiple back-side optical connector receptacles arranged on a back side of the optical patch unit, wherein each front-side optical connector receptacle corresponds to a single one of the back-side optical connector receptacles; and
    multiple optical interconnections, comprising an optical interconnection between each front-side optical connector receptacle and its corresponding back-side optical connector receptacle;
wherein the optical inputs and optical outputs for each optical equipment card are connected to the back-side optical connector receptacles, using optical cables, and wherein the optical connectors for each port of the optical shuffle unit are connected to the front-side optical connector receptacles of the optical patch unit, using optical cables, so that the optical equipment cards are interconnected according to the interconnection topology defined by the optical shuffle unit.

2. The optical equipment assembly of claim 1, wherein the optical patch unit is a passive patch panel comprising a single, static optical interconnection between each front-side optical connector receptacle and its corresponding back-side optical connector receptacle.

3. The optical equipment assembly of claim 1, wherein each of the front-side optical connector receptacles and each of the back-side optical connector receptacles accommodate a multi-fiber connector, and wherein each of the optical interconnections is a multi-link optical interconnection.

4. The optical equipment assembly of claim 1, wherein the optical connectors for one or more ports of the optical shuffle unit are each at a first end of a corresponding pigtail optical cable, and wherein the second end of each pigtail optical cable is permanently affixed to the optical shuffle unit.

5. A method for migrating an optical equipment assembly from a first interconnection topology defined by a first optical shuffle unit to a second interconnection topology defined by a second optical shuffle unit, each of the first and second optical shuffle units having a set of two or more optical connectors organized into two or more ports, wherein the optical equipment assembly further includes a plurality of optical equipment cards adapted for mounting in an equipment chassis with each of the optical equipment cards corresponding to one of the ports and having one or more optical inputs or optical outputs or both, the method comprising:
    disconnecting the first optical shuffle unit from an optical patch unit that is adapted for mounting in or on an optical equipment rack, the optical patch unit having multiple front-side optical connector receptacles and multiple back-side optical connector receptacles, each front-side optical connector corresponding to a back-side optical connector receptacle, and the optical patch unit further having an optical interconnection between each front-side optical connector receptacle and its corresponding back-side optical connector receptacle, and wherein the optical inputs and optical outputs for each optical equipment card are connected to the back-side optical connectors of the optical patch unit, using optical cables, and wherein the optical connectors for each port of the first optical shuffle unit are initially connected to the corresponding front-side optical connector receptacles, using optical cables, so that the optical equipment cards are interconnected according to the first interconnection topology defined by the first optical shuffle unit; and
    connecting the optical connectors for each port of the second optical shuffle unit to front-side connectors of the optical patch unit.

6. The method of claim 5, wherein the optical patch unit is a passive patch panel comprising a single, static optical interconnection between each front-side optical connector receptacle and its corresponding back-side optical connector receptacle, and wherein the method comprises, for each of at least one port of the passive patch panel, disconnecting the corresponding optical connectors for the first optical shuffle unit and connecting in their place corresponding optical connectors for the second optical shuffle unit.

* * * * *